United States Patent [19]

Uehara

[11] Patent Number: 4,973,870
[45] Date of Patent: Nov. 27, 1990

[54] ELECTROMAGNETIC CLUTCH WITH FLUX-EQUALIZED ROTATING MEMBER

[75] Inventor: Fumiaki Uehara, Gunma, Japan

[73] Assignee: Sanden Corporation, Gunma, Japan

[21] Appl. No.: 378,001

[22] Filed: Jul. 11, 1989

[30] Foreign Application Priority Data

Jul. 11, 1988 [JP] Japan .................. 63-90908

[51] Int. Cl.$^5$ ............... H02K 7/108; F16D 27/10
[52] U.S. Cl. ................... 310/78; 192/84 C; 310/256
[58] Field of Search ........ 192/84 C; 188/73.2, 188/163, 218 X; 310/77, 78, 105, 178, 254, 256, 261

[56] References Cited

U.S. PATENT DOCUMENTS

| | | | |
|---|---|---|---|
| 2,650,682 | 9/1953 | Oetzel | 188/164 |
| 3,324,982 | 6/1967 | Mason et al. | 192/84 C |
| 3,371,758 | 3/1968 | Stuhlmiller | 192/84 |
| 4,227,600 | 10/1980 | Shirai | 192/84 C |
| 4,446,203 | 5/1984 | Okubo et al. | 428/323 |
| 4,635,774 | 1/1987 | Sekiguchi et al. | 192/84 C |
| 4,828,091 | 5/1989 | Gustin | 192/84 C |

FOREIGN PATENT DOCUMENTS 321735 1/1903 France .
52-151258 11/1977 Japan .
1078749 8/1967 United Kingdom .

Primary Examiner—Steven L. Stephan
Assistant Examiner—D. L. Rebsch
Attorney, Agent, or Firm—Banner, Birch, McKie & Beckett

[57] ABSTRACT

An electromagnetic clutch is disclosed which includes a rotor having a friction surface and an armature plate having a friction surface. Both friction surfaces face each other. An annular friction member of non-magnetic material is fixedly disposed on the friction surface of the armature plate. The thickness of the annular friction member is gradually decreased from its radially-outer edge to its radially innermost edge, thereby preventing the restriction of the number of magnetic lines of flux which radially penetrate through the armature plate. The decreasing thickness increases the magnetic attraction between the armature plate and the rotor without increasing the weight of the electromagnetic clutch.

18 Claims, 3 Drawing Sheets

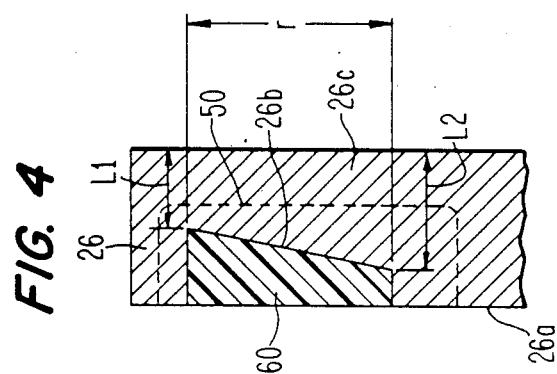
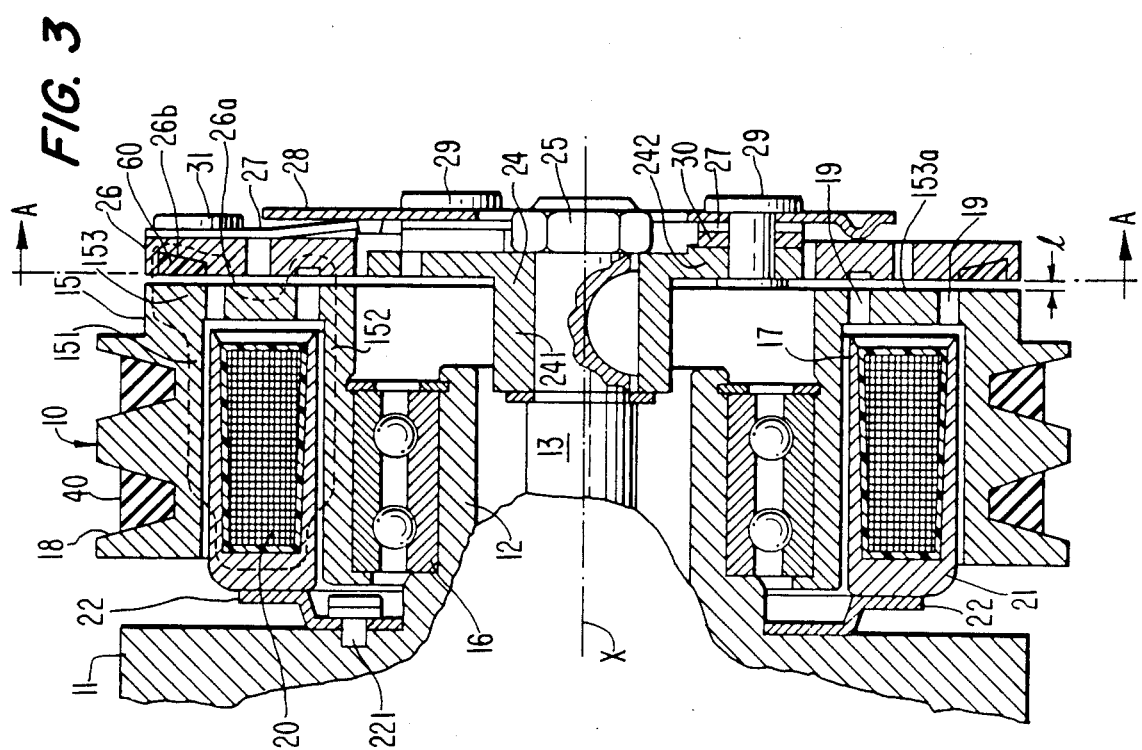

ELECTROMAGNETIC CLUTCH WITH FLUX-EQUALIZED ROTATING MEMBER

BACKGROUND OF THE INVENTION

1. Field of the Invention

This invention generally relates to an electromagnetic clutch, such as for use in controlling the transmission of power from an automobile engine to a refrigerant compressor in an automobile air conditioning system, and more particularly, to a structure of a friction surface of the electromagnetic clutch.

2. Description of the Prior Art

An embodiment of Japanese Utility Model Application No. 52-151258 is essentially illustrated in FIG. 1. Electromagnetic clutch 10' is intended to be coupled to a refrigerant compressor in an automobile air conditioning system. Compressor housing 11 is provided with a cantilevered tubular extension 12 surrounding an extension of drive shaft 13 of the compressor. Drive shaft 13 is rotatably supported in the compressor housing 11 by bearings (not shown). Axis X is the horizontal axis about which hub 24, armature plate 26, and clutch rotor 15 rotate. All radial dimensions are derived with respect to axis X.

Clutch rotor 15 is rotatably supported on tubular extension 12 through bearing 16 which is mounted on the outer surface of tubular extension 12. Clutch rotor 15 is made of magnetic material, such as steel, and comprises outer annular cylindrical portion 151, inner annular cylindrical portion 152 and axial end plate portion 153, which connects outer and inner cylindrical portions 151 and 152 at the axial forward end (to the right in FIG. 1). Annular U-shaped cavity 17 is defined by portions 151, 152 and 153. A plurality of V-shaped grooves 18 are provided on the outer peripheral surface of outer annular cylindrical portion 151 for receiving belt 40 to couple the compressor to the output of the automobile engine (not shown).

Axial end plate portion 153 includes one or more concentric slits 19 which are disposed on one or more concentric circles. These slits 19 define a plurality of annular or arcuate magnetic pieces with the surface of the poles being on the axial end plate portion 153.

Electromagnetic coil 20 is disposed in annular cavity 17 of clutch rotor 15 to supply magnetic flux 50 for attracting armature plate 26 to axial end plate portion 153 of rotor 15. Coil 20 is contained within annular magnetic housing 21 having a U-shaped cross section. Housing 21 is fixed to supporting plate 22, which is secured to the axial end surface of compressor housing 11 by a plurality of rivets 221. A small air gap is maintained between coil housing 21 and clutch rotor 15.

Hub 24 is disposed on the terminal end of drive shaft 13. Hub 24 is secured to drive shaft 13 by nut 25. The hub 24 comprises tubular member 241 secured on the terminal end of drive shaft 13 and radial flange portion 242 extending radially from the axial end of tubular member 241. Flange portion 242 is integrally formed with tubular member 241. Alternatively, flange portion 242 may be formed separately from the tubular member 241 and fixed on the tubular member 241 by any known securing method, for example, by welding.

Annular armature plate 26 is composed of magnetic material, is concentric with hub 24, and faces the axial end plate portion 153 with a predetermined axial air gap 1 therebetween. Armature plate 26 is elastically connected to flange portion 242 of hub 24 through a plurality of leaf springs 27. Armature plate 26 includes friction surface 26a facing friction surface 153a of axial end plate portion 153 of rotor 15. Stopper plate 28 and one end of each leaf spring 27 are secured by rivets 29 to the outer surface of flange portion 242 through spacing member 30. The other end of each leaf spring 27 is fixed to armature plate 26 by rivet 31 to support armature plate 26 flexibly for axial movement upon deflection of leaf spring 27.

Thus, when electromagnetic coil 20 is energized, armature plate 26 is attracted to axial end plate portion 153 of rotor 15, and thus friction surfaces 26a and 153a engage each other. Drive shaft 13 is then rotated together with rotor 15 by the engine output through leaf spring 27 and hub 24.

When electromagnetic coil 20 is not energized, armature plate 26 is separated from rotor 15 due to the elasticity of leaf springs 27. Rotor 15 is thus rotated by the engine output, but the compressor is not driven.

Referring to FIG. 2, to enhance the torque transmission from the rotor to the armature plate, friction member 60' of non-magnetic material is fixedly disposed within annular groove 26b' formed near the radially-outermost edge of friction surface 26a of armature plate 26. Accordingly, magnetic flux 50 radially penetrates through annular portion 26c' of armature plate 26. Furthermore, the depth of annular groove 26b' is uniform across the distance from the radially-outer edge of the annular groove 26b' to the radially-inner edge of the annular groove 26b'. When viewed from a position horizontally perpendicular too the axial direction, the cross section of annular groove 26b' is rectangular. That is, thickness L1 of annular portion 26c' of armature plate 26 is uniform from the radial outer edge of the annular groove 26b' to the radial inner edge of annular groove 26b'. The width of annular portion 26c' is denoted as r.

In this prior art device, the peripheral area of the radially inner side of annular portion 26c' is smaller than peripheral area of the radially outer side of annular portion 26c' with a difference equal to "$2\pi rL1$". Therefore, magnetic resistance at the periphery of the radial-inner side of annular portion 26c' is larger than the magnetic resistance at the periphery of the radial-outer side of annular port 26c'.

Accordingly, the number of magnetic lines of flux which radially penetrate through annular portion 26c' is restricted by the peripheral area of the radially inner side of annular portion 26c', thereby creating the situation where an increase in electric power is not accompanied by a proportionate increase in electromagnetic attraction.

Furthermore, the above defect, if solved by increasing the thickness of the armature plate, is then replaced by another defect, such as an increases in the weight of the electromagnetic clutch.

SUMMARY OF THE INVENTION

Accordingly, it is an object of this invention to provide an electromagnetic clutch that does not unnecessarily restrict the number of magnetic lines of flux that radially penetrate through an armature plate without increasing the weight thereof.

An electromagnetic clutch includes a first rotatable member of magnetic material, such as a clutch rotor, and a second rotatable member, such as a drive shaft. An annular armature plate of magnetic material is joined to the second rotatable member so that the armature plate can axially move within a limited range. A friction surface of the armature plate faces a friction surface of the first rotatable member with an axial air gap therebetween. An annular friction member of non-magnetic material is fixedly disposed on the friction surface of the armature plate.

An electromagnetic device is associated with the first rotatable member for attracting the armature plate to the friction surface of the first rotatable member so that rotation of the first rotatable member can be transmitted to the second rotatable member through the armature plate by the operation of the electromagnetic device.

The thickness of the annular friction member is gradually decreased from a radially-outer edge of the armature plate to a radially-inner edge thereof.

BRIEF DESCRIPTION OF THE DRAWINGS

FIG. 3 illustrates a side elevational sectional view of the electromagnetic clutch in accordance with one embodiment of the present invention.

FIG. 4 illustrates a fragmentary sectional view of the armature plate of the electromagnetic clutch shown in FIG. 3.

DETAILED DESCRIPTION OF THE PREFERRED EMBODIMENT

Figure 2:
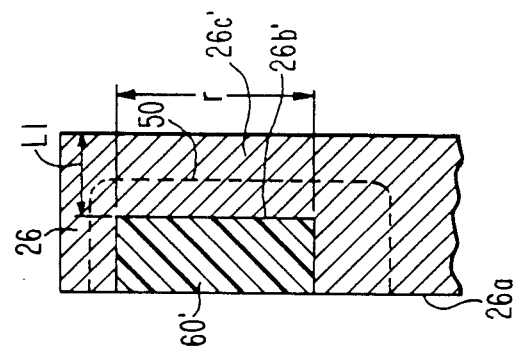
FIG. 2 illustrates f fragmentary sectional view of the armature plate of the electromagnetic clutch shown in FIG. 1.
Figure 1:
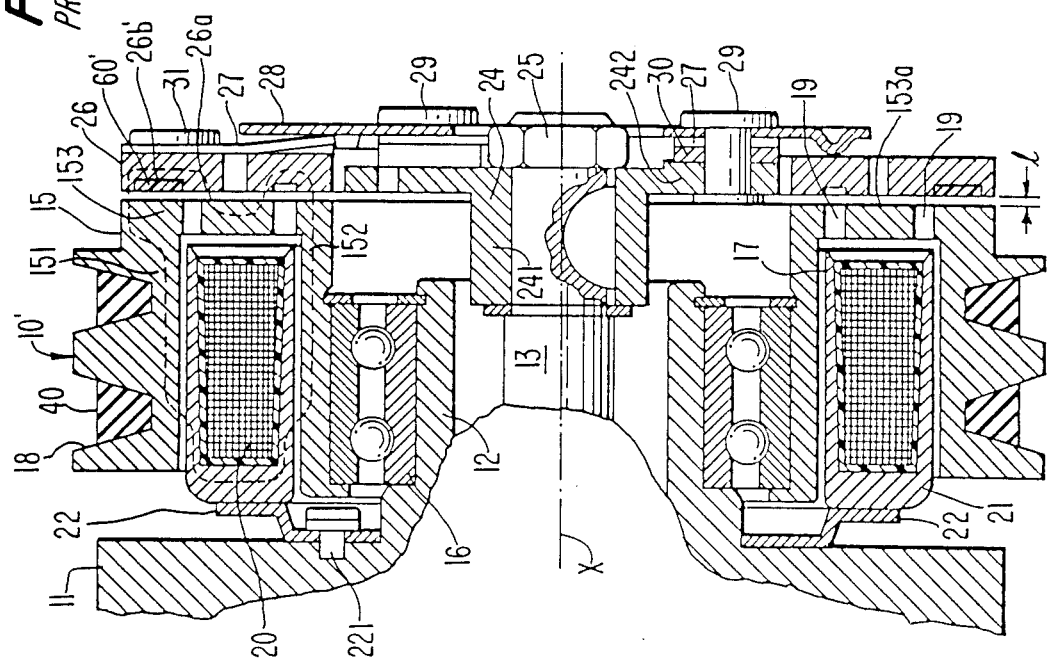
FIG. 1 illustrates a side elevational sectional view of an electromagnetic clutch in accordance with a prior art device.
Figure 5:
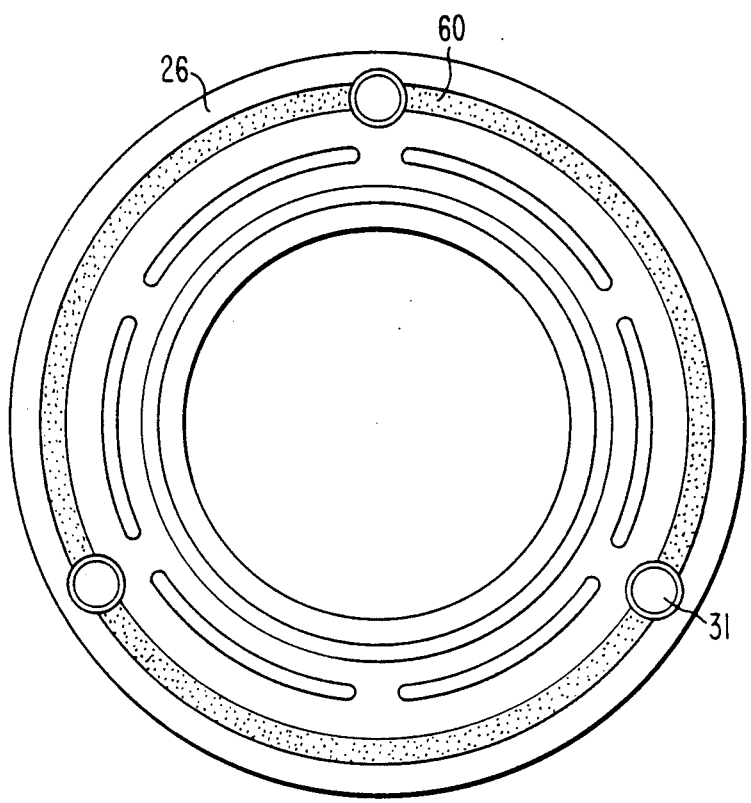
FIG. 5 illustrates an end view of the friction surface of the armature plate shown in FIG. 3 taken along line A—A.

Referring to FIGS. 3, 4 and 5, electromagnetic clutch 10 in accordance with one embodiment of the present invention is shown. In FIGS. 3, 4 and 5, the same numerals are used to denote the corresponding elements shown in FIGS. 1 and 2, thus an explanation thereof is omitted.

Annular friction member 60 of non-magnetic material, for example, aromatic polyamide resin fiber (named "Kevlar" as a trademark) in molded phenol resin is fixedly disposed within annular groove 26b formed proximate to the radially-outermost edge of friction surface 26a of armature plate 26. The depth of annular groove 26b gradually decreases from the radially-outer edge to the radially-inner edge thereof so that cross section of annular groove 26b, when viewed from a position horizontally perpendicular to the axial direction, is trapezoidal in shape. Thus, the thickness of annular portion 26c of armature plate 26, which radially corresponds to annular groove 26b, gradually increases from the radially-outer edge of the friction member to the radially-inner side thereof as shown in FIG. 4. The thicknesses of the radially outer and inner sides of annular portion 26c are indicated "L1" and "L2" respectively and the width of annular portion 26c is indicated "r".

In a preferred embodiment, the thickness of the radially-inner side of annular portion 26c "L2" is determined so as to substantially equate the peripheral area of the radially inner side of annular portion 26c and the peripheral area of the radially outer side of annular portion 26c. Accordingly, the restriction of the number of magnetic lines of lux which radially penetrate through annular portion 26c is prevented without any increase in the thickness and weight of armature plate 26. In general, the thickness of the radially-inner side of annular portion 26c "L2" is chosen so as to reduce, to the extent possible in a given arrangement, the magnetic resistance by providing as much area as possible for the flux to flow.

Although friction member 60 has been described as an annular friction member, the invention is not limited in this respect. For example, the annular friction member may be formed as a plurality of arcuate portions disposed at predetermined positions on the armature plate.

Furthermore, the annular friction member could be placed in the rotor alone or in both the rotor and the armature plate.

This invention has been described in detail in connection with the preferred embodiment, but the preferred embodiment is an example only and this invention is not restricted thereto. It will be easily understood by those skilled in the art that other variations and modifications can be easily made within the scope of the invention, which is defined by the appended claims.

We claim:

1. In an electromagnetic clutch including a first rotatable member made of magnetic material and having a first friction surface associated therewith, a second rotatable member, an annular magnetic armature plate having a second friction surface associated therewith and coupled to said second rotatable member so as to be capable of limited axial movement, said first friction surface facing said second friction surface with a predetermined axial air gap therebetween, and electromagnetic means associated with said first rotatable member for attracting said second friction surface to said first friction surface such that rotational force may be transmitted to said second rotatable member, an improvement comprising an annular friction member of non-magnetic material fixedly disposed in an annular cut-out portion formed in at least one of said friction surfaces, said annular friction member and said annular cut-out portion configured so as to reduce the magnetic resistance of the at least one of said annular magnetic armature plate and said first rotatable member.

2. The electromagnetic clutch in accordance with claim 1 wherein said annular cut-out portion is formed in said second friction surface.

3. The electromagnetic clutch in accordance with claim 1 wherein the depth of said cut-out portion decreases from a first radial outer edge to a second radial inner edge.

4. The electromagnetic clutch in accordance with claim 2 wherein the depth of said cut-out portion decreases from a first radial outer edge to a second radial inner edge.

5. The electromagnetic clutch in accordance with claim 2 wherein said annular friction member comprises an aromatic polyamide resin fiber in molded phenol resin.

6. The electromagnetic clutch in accordance with claim 2 wherein the thickness of said annular friction member decreases from a first radial outer edge to a second radial inner edge.

7. The electromagnetic clutch in accordance with claim 1 wherein said annular friction member comprises an aromatic polyamide resin fiber in molded phenol resin.

8. The electromagnetic clutch in accordance with claim 1 wherein the thickness of said annular friction member decreases from a first radial outer edge to a second radial inner edge.

9. An electromagnetic clutch comprising:
   a first rotatable member comprising a magnetic material and including a first friction surface associated therewith;
   a second rotatable member;
   an annular magnetic armature plate coupled to said second rotatable member so as to be capable of limited axial movement, said annular magnetic armature plate including a second friction surface associated therewith and arranged so as to face said first friction surface with an axial air gap therebetween;
   electromagnetic means associated with said first rotatable member and said annular magnetic armature plate for attracting said second friction surface to said first friction surface such that rotational force may be transmitted to said second rotatable member; and
   a friction member of non-magnetic material fixedly disposed in a cut-out portion formed in at least one of said friction surfaces, said cut-out portion configured so as to reduce the magnetic resistance of the at least one of said annular magnetic armature plate and said first rotatable member.

10. The electromagnetic clutch in accordance with claim 9 wherein said cut-out portion is formed in said second friction surface.

11. The electromagnetic clutch in accordance with claim 10 wherein said friction member comprises an annular friction member.

12. The electromagnetic clutch in accordance with claim 9 wherein said friction member comprises an annular friction member.

13. The electromagnetic clutch according to claim 9 wherein the depth of said cut-out portion decreases from a first radial edge to a second radial edge.

14. The electromagnetic clutch according to claim 9 wherein the thickness of said friction member decreases from a first radial edge to a second radial edge.

15. The electromagnetic clutch according to claim 9 wherein said cut-out portion is an annular groove formed in at least one of said friction surfaces.

16. The electromagnetic clutch according too claim 15 wherein said friction member is an annular friction member disposed in said annular groove.

17. The electromagnetic clutch according to claim 1 wherein the depth of said cut-out portion decreases from a first radial edge to a second radial edge.

18. The electromagnetic clutch according to claim 1 wherein the thickness of said annular friction member decreases from a first radial edge to a second radial edge.

* * * * *